United States Patent
Leimcke et al.

(10) Patent No.: US 9,352,516 B2
(45) Date of Patent: May 31, 2016

(54) METHOD AND APPARATUS FOR PRODUCING A SCRIM

(71) Applicant: KARL MAYER MALIMO TEXTILMASCHINENFABRIK GMBH, Chemnitz (DE)

(72) Inventors: Tobias Leimcke, Chemnitz (DE); Thomas Heinecke, Chemnitz (DE)

(73) Assignee: KARL MAYER MALIMO TEXTILMASCHINENFABRIK GMBH, Chemnitz (DE)

( * ) Notice: Subject to any disclaimer, the term of this patent is extended or adjusted under 35 U.S.C. 154(b) by 248 days.

(21) Appl. No.: 14/088,814

(22) Filed: Nov. 25, 2013

(65) Prior Publication Data

US 2015/0059128 A1    Mar. 5, 2015

(30) Foreign Application Priority Data

Sep. 2, 2013    (EP) .................................... 13182587

(51) Int. Cl.
| | |
|---|---|
| *B29C 70/20* | (2006.01) |
| *D04H 1/74* | (2006.01) |
| *D04H 3/04* | (2012.01) |
| *D02J 1/18* | (2006.01) |
| *D04H 3/002* | (2012.01) |

(52) U.S. Cl.
CPC . *B29C 70/20* (2013.01); *D02J 1/18* (2013.01); *D04H 1/74* (2013.01); *D04H 3/002* (2013.01); *D04H 3/04* (2013.01)

(58) Field of Classification Search
CPC .......... D01G 25/00; B29C 70/20; D04H 1/74; D04H 3/04
See application file for complete search history.

(56) References Cited

U.S. PATENT DOCUMENTS

| | | | | |
|---|---|---|---|---|
| 3,761,345 | A | * 9/1973 | Smith | .................... B29C 70/081 112/415 |
| 4,325,999 | A | * 4/1982 | Campman | ................ D04H 3/04 156/181 |
| 5,824,178 | A | 10/1998 | Shingu et al. | |
| 6,585,842 | B1 | 7/2003 | Bompard et al. | |

(Continued)

FOREIGN PATENT DOCUMENTS

| | | |
|---|---|---|
| DE | 10 2009 042 384 | 4/2011 |
| EP | 0 740 996 | 11/1996 |

(Continued)

OTHER PUBLICATIONS

European Search Report conducted in counterpart European Appln. No. 13 18 2587 (Jan. 2, 2014).

*Primary Examiner* — Shaun R Hurley
(74) *Attorney, Agent, or Firm* — Greenblum & Bernstein, P.L.C.

(57) ABSTRACT

Method and apparatus for producing a scrim. The method includes depositing several band sections next to one another on a conveyor device that at least temporarily moves in a direction of transport. The direction of transport is oriented at a predetermined angle to a band direction and each band section has a front edge running in the band direction and a rear edge running in the band direction. The method also includes placing the band sections so that the rear edge of a first band section is adjacent the front edge of a second band section, calculating a rear-edge shape of the first band section and a front-edge shape of the second band section and placing the second band section on the conveyor device relative to the first band section as a function of a relation between the front-edge shape and the rear-edge shape.

12 Claims, 1 Drawing Sheet

(56) References Cited

U.S. PATENT DOCUMENTS

| | | | |
|---|---|---|---|
| 6,919,118 B2 * | 7/2005 | Bompard | B29C 70/202 428/102 |
| 2002/0006496 A1 * | 1/2002 | Wienands | D04H 3/002 428/100 |
| 2002/0123819 A1 | 9/2002 | Baudry et al. | |
| 2003/0148082 A1 | 8/2003 | Bompard et al. | |
| 2004/0255441 A1 * | 12/2004 | Wienands | D04B 23/10 28/107 |
| 2005/0205213 A1 | 9/2005 | Bompard et al. | |
| 2008/0223505 A1 | 9/2008 | Bompard et al. | |
| 2008/0289743 A1 | 11/2008 | Tsotsis | |
| 2009/0217498 A1 * | 9/2009 | Dos Santos | D01G 23/06 28/102 |

FOREIGN PATENT DOCUMENTS

| | | |
|---|---|---|
| EP | 2 003 232 | 12/2008 |
| EP | 2 033 754 | 3/2009 |
| EP | 2 151 517 | 2/2010 |

* cited by examiner

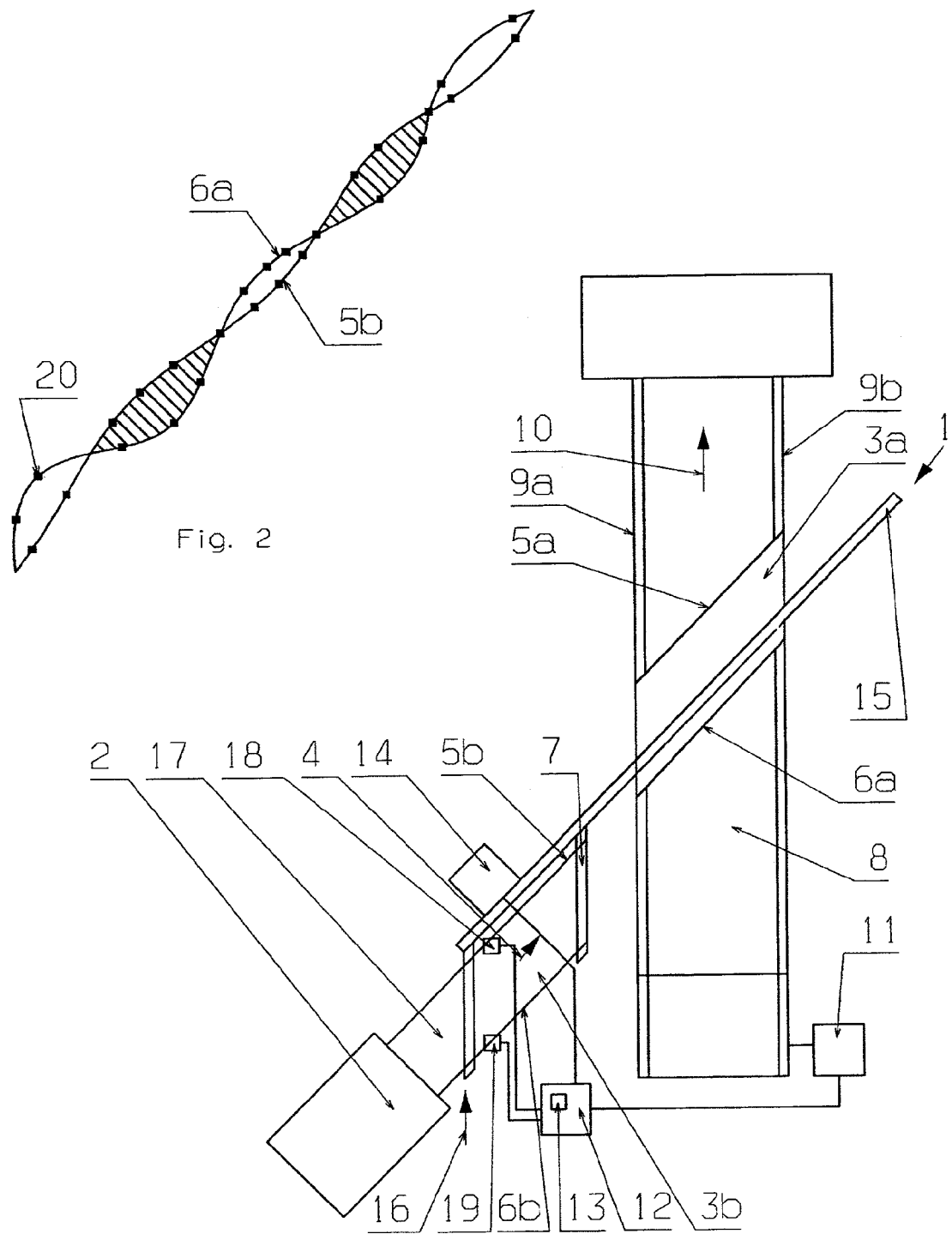

METHOD AND APPARATUS FOR PRODUCING A SCRIM

CROSS-REFERENCE TO RELATED APPLICATIONS

The present application claims priority under 35 U.S.C. §119 of European Patent Application No. 13 182 587.9, filed Sep. 2, 2013, the disclosure of which is expressly incorporated by reference herein in its entirety.

BACKGROUND OF THE INVENTION

1. Field of the Invention

The invention relates to a method for producing a scrim in which several web sections are deposited next to one another on a conveyor device which at least temporarily moves in a direction of transport. The direction of transport forms a predetermined angle with a band direction, each edge section has a front edge running in the band direction and a rear edge running in the band direction, and the band sections are deposited such that the rear edge of a first band section and the front edge of a second band section are adjacent.

Furthermore, the invention relates to an apparatus for producing a scrim which has a conveyor device that can be moved in a direction of transport, a band section feeder device, and a placer which removes band sections from the band section feeder device, guides the band sections over the conveyor device in a band direction that forms a predetermined angle with the direction of transport, and deposits the band sections next to one another in the direction of transport on the conveyor device.

2. Discussion of Background Information

A method and apparatus of the above-noted types are for known, e.g., from EP 2 151 517 A1, in which it was determined that the band sections do not all have the same width, i.e., they do not have the same extension in the direction of transport. In order to nevertheless achieve a desired structure of the scrim, it was therefore provided that the width of each individual band section be calculated and that the speed of the placer, which guides the band sections over the conveyor device and deposits the band sections on the conveyor device, be controlled such that the continuously moved conveyor device has transported the previously deposited band section precisely far enough so that the next band can be deposited in the desired position. In the desired position, the two adjacent band sections can lay edge-to-edge, or they can overlap one another in a predetermined manner or have a predetermined space between one another.

However, it has become evident that, even by measuring the width, the predetermined structure of the scrim cannot always be achieved to the desired extent.

SUMMARY OF THE INVENTION

In embodiments of the invention a predetermined structure of a scrim in the most accurate possible manner can be achieved.

Accordingly, in a method of the type generally discussed above, a rear-edge shape of the first band section and a front-edge shape of the second band section are calculated and the second band section is deposited on the conveyor device relative to the first band section as a function of a relation between the front-edge shape and the rear-edge shape.

In this solution, it is taken into account that the band sections cannot only differ overall in their width, but that they can also have a width varying over their length. In other words, the width of a band section is not necessarily constant over its length. Accordingly, the front edge and the rear edge are in many cases also not embodied as straight lines, but rather have undulations, irregularities, or defects. These deviations from a straight line that run parallel to the band direction can be taken into account if the edge shape of the front edge and of the rear edge is calculated.

In the invention, the band sections are composed of fibers or filaments that are essentially aligned parallel to run in the band direction. These fibers or filaments are preferably carbon fibers, which exhibit virtually no stretching. Accordingly, even small differences in tension at the edges cause irregularities, which manifest themselves in a deviation of the shape of the corresponding edge from a straight line. If the shape of the edge is now calculated, then these irregularities can be calculated and taken into account.

The taking into account of the front-edge shape and the rear-edge shape depends on the desired structure of the scrim. Thus, it can be specified, for example, that no spaces whatsoever are present between the rear edge of the first band section and the front edge of the second band section. In this case, it is accepted that certain regions of the web sections overlap one another. Another possibility includes specifying that the two band sections have no overlaps whatsoever. In this case, it is accepted that spaces occur between adjacent band sections. In a third, preferred approach, the spaces and the overlap regions between the two adjacent band sections are minimized. This can, for example, be described in a simplified manner in that the size of the overlap regions is identical to the size of the space regions between the two adjacent band sections.

Preferably, the front-edge shape and/or the rear-edge shape are calculated as the difference from a line running in the band direction. This simplifies the calculation rather significantly. The irregularities or defects at the edges of the band section are typically not all that large. They normally lie within a range of millimeters and are often even less than 1 mm. Accordingly, the virtual line running in the band direction can be positioned such that only relatively small differences from this line ever occur.

Preferably, the front-edge shape and/or the rear-edge shape are calculated respectively in the form of sampling points. There thereby occurs the utilization of the knowledge that irregularities or defects at the edges of the web section do not usually occur as points of discontinuity, but rather that they manifest themselves in smooth transitions. It is therefore possible to indicate the shape of the front edge and/or the rear edge using a sequence of points, so that the amount of data to be processed remains small.

Preferably, the sampling point at the front edge and at the rear edge is respectively calculated in identical positions in a direction crosswise to the direction of transport. This has the advantage that, in case of a later analysis of the front-edge shape and of the rear-edge shape, measured values are available which refer respectively to the same position crosswise to the direction of transport. Accordingly, no interpolations or conversions are necessary; rather, the measured values can be used directly for the calculation of the desired placement.

Preferably, a minimal area difference between the front-edge shape and the rear-edge shape is used as a relation. This can be realized, for example, in that a virtual rear edge of the first band section lies such that the area between the real rear edge and the virtual rear edge becomes equal to zero, such that area regions are counted negatively on one side of the virtual rear edge and positively on the other side. The same approach is applied in the case of the front edge of the second band section. Here, a virtual front edge is placed such that an area difference of zero from the real front edge results. The two band sections are then positioned such that the virtual rear edge and the virtual front edge coincide.

Preferably, the front-edge shape and/or the rear-edge shape are calculated during the guiding of the band section over the conveyor device. Accordingly, a relatively small sensor, which does not require much installation space, can be used for the calculation of the shape of the front edge and the calculation of the shape of the rear edge. The front edge and the rear edge are then guided past the sensors, which can thereby calculate the shape. Thus, no additional time is required for the calculation of the edge shapes.

Preferably, the front-edge shape and the rear-edge shape of a band section are calculated simultaneously and at least one shape thereof is saved temporarily. When a band section is moved toward the conveyor device, the front-edge shape and the rear-edge shape can be calculated simultaneously. However, only the front-edge shape is required for the positioning of the band section here, as the front-edge shape needs to be interrelated with the rear-edge shape of an already-deposited band section. The rear-edge shape is therefore saved and used during the depositing of the next band section. The front-edge shape and the rear-edge shape of a single band section are thus not analyzed simultaneously.

An apparatus of the type generally described above includes a measuring device for the front-edge shape, which calculates a front-edge shape of a band section, and a measuring device for the rear-edge shape, which calculates a rear-edge shape of a band section, that are connected to a drive control that controls at least one of a movement of the conveyor device and a movement of the placer as a function of a relation between the front-edge shape and the rear-edge shape.

As explained above in connection with the method, it is possible to take into account that the width of a band section can indeed vary over the length of this band section. For this reason, the calculation of the width of the band section or of a previously deposited band section is not sufficient to effect a positioning of the band section to be deposited such that the desired structure of the scrim is produced. However, if the shape of the rear edge of a deposited band section and the shape of the front edge of a band section that is to be newly deposited are interrelated to one another, then the structure of the scrim can be adapted to a great extent to the desired or predetermined structure.

Preferably, the measuring device for the front-edge shape and/or the measuring device for the rear-edge shape are arranged between the band section feeder device and the conveyor device. There is usually enough installation space available here. Both edges of the band section can then be guided over the two measuring devices during the guiding of the band section from the band section feeder device to the conveyor device so that the front-edge shape and/or the rear-edge shape can be calculated automatically during the guiding or transporting of the band section from the band section feeder device to the conveyor device.

Preferably, the measuring device for the front-edge shape and/or the measuring device for the rear-edge shape are embodied or formed as a contactless or touchlessly operating measuring device. In this manner, an additional disruption of the shape of the front edge and/or the rear edge is thus avoided. The front edge and the rear edge are not mechanically influenced. An optical measuring device, for example, a line scan camera, an electric measuring device, or a similar device can be used as a contactless or touchlessly operating measuring device.

Preferably, the measuring device for the front-edge shape and/or the measuring device for the rear-edge shape is connected to a memory device. The memory device can save the shape of the front edge and/or the rear edge at least temporarily, so that the shape of the rear edge of a first band section and the shape of the front edge of a second band section are available simultaneously, even when these two shapes are calculated in a staggered manner. The shapes of the front edge and rear edge of a band section thus do not need to be analyzed simultaneously.

Preferably, the measuring device for the front-edge shape and/or the measuring device for the rear-edge shape can be displaced in the direction of transport. Thus, an adjustment to different nominal widths of the band sections can be carried out in a simple manner. Typically, it can be assumed that the band sections fed have a certain nominal size, to which one or both measuring devices can be set. If this nominal size changes, then one or both shape-measuring devices can be displaced such that they can still calculate the edge shape. Accordingly, relatively small edge-shape measuring devices can be used that are also cost-efficient.

Embodiments of the invention are directed to a method for producing a scrim. The method includes depositing several band sections next to one another on a conveyor device that at least temporarily moves in a direction of transport. The direction of transport is oriented at a predetermined angle to a band direction and each band section has a front edge running in the band direction and a rear edge running in the band direction. The method also includes placing the band sections so that the rear edge of a first band section is adjacent the front edge of a second band section, calculating a rear-edge shape of the first band section and a front-edge shape of the second band section and placing the second band section on the conveyor device relative to the first band section as a function of a relation between the front-edge shape and the rear-edge shape.

According to embodiments, at least one of the front-edge shape and the rear-edge shape can be calculated as the difference from a line running in the band direction. Further, at least one of the front-edge shape and the rear-edge shape may be calculated at respective sampling points. Moreover, the sampling points at the front edge and at the rear edge can be calculated respectively in identical positions in a direction crosswise to the direction of transport.

In accordance with other embodiments, the relation may be a minimal area difference between the front-edge shape and the rear-edge shape.

In further embodiments, the method can include calculating at least one of the front-edge shape and the rear-edge shape as the band section is guided to or over the conveyor device.

According to still other embodiments of the instant invention, the method can further include simultaneously calculating the front-edge shape and the rear-edge shape of a band section and temporarily saving at least one of the calculated front-edge shape and rear-edge shape of the band section.

Embodiments of the invention are directed to an apparatus for producing a scrim. The apparatus includes a conveyor device movable in a direction of transport; a band section feeder device; and a placer structured and arranged to remove band sections from the band section feeder device, to guide the band sections over the conveyor device in a band direction oriented a predetermined angle to the direction of transport, and to deposit the band sections next to one another on the conveyor device in the direction of transport. A front-edge shape measuring device is structured and arranged to calculate a front-edge shape of a band section and a rear-edge shape measuring device is structured and arranged to calculate a rear-edge shape of a band section. A drive control connected to the front-edge shape measuring device and the rear-edge shape measuring device can be structured to control a movement of at least one of the conveyor device and the placer as a function of a relation between the front-edge shape and the rear-edge shape.

According to embodiments, at least one of the front-edge shape measuring device and the rear-edge shape measuring device can be arranged between the band section feeder device and the conveyor device.

In accordance with other embodiments, at least one of the front-edge shape measuring device and the rear-edge shape measuring device may be embodied as a contactless measuring device.

According to further embodiments of the invention, the apparatus can further include a memory device. At least one of the front-edge shape measuring device and the rear-edge shape measuring device can be connected to the memory device.

In accordance with still yet other embodiments of the present invention, at least one the front-edge shape measuring device and the rear-edge shape measuring device can be displaceable in the direction of transport.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a considerably schematized representation of an apparatus for producing a scrim; and FIG. 2 shows a considerably schematized representation of a shape of a front edge and a shape of a rear edge.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 schematically illustrates an apparatus 1 for producing a scrim, such as a monoaxial scrim as in the illustrated embodiment.

A monoaxial scrim is a fabric in which a plurality of fibers or filaments are aligned essentially parallel to one another, that is, in the same direction, and arranged next to one another. The scrim has in the direction of these fibers or filaments a relatively high stability against tensile forces. If stability in other directions is also desired, multiple scrims of this type are placed on top of one another, such that the directions of the fibers or filaments then differ from one another. In the present exemplary embodiment, only one single layer of the scrim is produced, having fibers, in particular carbon fibers, aligned in one direction.

The apparatus 1 has a band section feeder device 2, from which band sections 3a, 3b can be removed. Only two band sections 3a, 3b are illustrated. However, it is clearly evident for the person skilled in the art that a plurality of band sections 3a, 3b can be removed from the band section feeder device.

The embodiment of the band section feeder device 2 can be realized in various manners. For example, the band sections 3a, 3b can be drawn off and severed from a roll on which a band material of the correspondingly arranged fibers has been wound up. It is also possible to produce a band on-line, e.g., by spreading apart fiber bundles to form narrow bands and guiding several narrow bands next to one another until a band of a desired width has been produced. The band sections 3a, 3b can also be stored prefabricated in a magazine.

The band sections 3a, 3b have a band direction 4. The fibers of band section 3a, 3b are aligned in band direction 4. Furthermore, the band sections 3a, 3b have a front edge 5a, 5b and a rear edge 6a, 6b.

A placer 7 is provided in order to grasp a band section 3b and transport it from the band section feeder device 2 to a conveyor device 8. The conveyor device 8 has in the present case two conveyor chains 9a, 9b running parallel that can be moved in a direction of transport 10. The movement can occur continuously with constant speed or with variable speed. The conveyor chains 9a, 9b can also be moved intermittently. However, a synchronization of the two conveyor chains 9a, 9b is to be ensured in any case.

The conveyor chains 9a, 9b are driven by a drive 11. The drive 11 is connected to a control device 12 which has a memory 13.

The movement of the placer 7 is controlled by a placer drive 14, which can move the placer 7 back and forth in the band direction 4 on a rail 15. In many cases, more than one rail 15 will be provided. However, additional rails are not illustrated for reasons of clarity. The placer drive 14 is also connected to the control device 12.

A severing device 16 denoted by an arrow severs the band sections 3a, 3b from a band. 17 that is dispensed by the band section feeder device 2. If the band sections 3a, 3b are already present in severed form, then the band section feeder device 2 can also be embodied as a magazine.

The control device 12 is furthermore connected to a measuring device 18 for the front-edge shape and to a measuring device 19 for the rear-edge shape. The measuring device 18 for the front-edge shape calculates the shape of the front edge 5a, 5b of the band sections 3a, 3b. The measuring device 19 for the rear-edge shape calculates the shape of the rear edges 6a, 6b of the band sections 3a, 3b.

The measuring device 18 for the front-edge shape and the measuring device 19 for the rear-edge shape can, to a certain extent, be displaced parallel to the direction of transport 10, so that they can be adjusted to different nominal widths of the band sections 3a, 3b. The width of the band sections 3a, 3b is the extension parallel to the direction of transport 10.

Apart from this, the measuring device 18 for the front-edge shape and the measuring device 19 for the rear-edge shape are arranged in a stationary manner, They calculate the shape of the front edge 5a, 5b or the shape of the rear edge 6a, 6b, while the placer 7 moves the band section 3a, 3b from the band section feeder device 2 to the conveyor device 8. The front edge 5a, 5b thereby passes over the measuring device 18 for the front-edge shape, and the rear edge 6a, 6b passes over the measuring device 19 for the rear-edge shape.

The measuring device 19 for the rear-edge shape is connected to the memory 13 in the control device 12 so that the shape of the rear edge 6a of an already deposited first band section 3a is, e.g., available in the memory 13, i.e., until the shape of the front edge 5b of the second band section 3b has been calculated at a later point in time. It is thus possible to bring the shape of the rear edge 6a of the first band section 3a and the shape of the front edge 5b of the second band section 3b into line with one another in a desired manner.

FIG. 2 schematically illustrates, in considerably exaggerated form, the shape of the rear edge 6a of the first band section 3a and the shape of the front edge 5b of the second band section 3b. Hatched regions are thereby intended to represent an overlap of the two band sections 3a, 3b. Empty regions between the rear edge 6a and the front edge 5b are intended to indicate spaces.

Several sampling points 20 are illustrated. Expediently, the shape of the front edge 5b and the shape of the rear edge 6a are not calculated continuously, but rather in the form of multiple sampling points 20. Among other things, the number of sampling points 20 depends on the material used and the irregularity of the front edge 5b and the rear edge 6a that is to be expected. In many cases, it will be sufficient to select sampling points 20 at an interval along the front edge 5b or the rear edge 6a on the order of a few centimeters, e.g., 1, 2, 3, 4, 5, 6, 7, 8, 9, or 10 cm.

It is expedient, but not absolutely necessary, to arrange the sampling points 20 at regular intervals.

Advantageously, the sampling points 20 at the rear edge 6a and at the front edge 5b crosswise to the direction of transport 10 are, however, always calculated in the same position, i.e., the sampling points 20 matched to one another at the front edge 5b and at the rear edge 6a lie one after the other in the direction of transport. This facilitates the subsequent analysis of the shape of the front edge 5b and the shape of the rear edge 6a. One can limit him- or herself to interrelating the individual sampling points 20 to one another.

For this relation, there are various possibilities that can be specified.

One possibility includes arranging the two band sections 3a, 3b without any overlap whatsoever. In this case, it is accepted that spaces occur between the two band sections 3a, 3b.

Another possibility includes placing the two band sections 3a, 3b next to one another without any space at all. In this case, it is accepted that certain overlaps occur between the two band sections 3a, 3b.

A third possibility includes making the area of the spaces and the area of the overlaps approximately equal in size, as schematically illustrated in FIG. 2. A simple possibility for realizing this is the use of a virtual front edge and the use of a virtual rear edge. The virtual front edge is placed such that the real front edge 5b runs on both sides of the virtual front edge, namely such that the areas between the virtual front edge and the real front edge 5b are equal in size on both sides of the virtual front edge. It is possible to approach the rear edge 6a in the same manner. Here too, a virtual rear edge is placed such that the areas between the virtual rear edge and the real rear edge 6a are equal in size on both sides of the virtual rear edge. The band section 3b is then laid on the conveyor chains 9a, 9b such that the virtual front edge of band section 3b and the virtual rear edge of band section 3a coincide. If sampling points 20 are used, the virtual front edge or the virtual rear edge can be laid such that the sum of the distances from the sampling points of the respective edge is equal to zero, wherein distances in one direction are counted positively and distances in the other direction are counted negatively.

In order to achieve congruence between the virtual front edge and the virtual rear edge, different approaches can be selected.

One possibility includes driving the conveyor chains 9a, 9b such that, in a movement of the placer 7 for bringing up the second band section 3b, the first band section 3a has been moved back by exactly the distance that is required to position the band section 3b. Another possibility includes controlling the speed of the placer 7 such that, with a conveyor device 8 operating at a constant speed, the second band section 3b can be deposited in the proper position. Both approaches can also be combined with one another.

Finally, it is also possible to move the second band section 3b over the conveyor device 8 and then control the conveyor device 8 such that the first band section 3a is moved far enough forward so that the second band section 3b can be deposited in the desired manner.

A measurement of the width of the band sections is in no case necessary or desired. Only the shape of the front edges 5a, 5b and the rear edges 6a, 6b is used. The shape of the front edge and the shape of the rear edge of a single band section are thereby not used simultaneously.

The measuring device 18 for the front-edge shape and the measuring device 19 for the rear-edge shape are embodied or formed as contactless or touchlessly operating measuring instruments or sensors. Preferably, they operate optically, e.g., in the form of line scan cameras or a scanner.

If a multiaxial scrim is to be produced instead of the illustrated monoaxial scrim, additional placers 7 are used, the direction of movement of which forms a different angle with the direction of transport 10.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for producing a scrim comprises:
    depositing several band sections next to one another on a conveyor device that at least temporarily moves in a direction of transport, the direction of transport being oriented at a predetermined angle to a band direction and each band section having a front edge running in the band direction and a rear edge running in the band direction;
    placing the band sections so that the rear edge of a first band section is adjacent the front edge of a second band section;
    calculating a rear-edge shape of the first band section and a front-edge shape of the second band section; and
    placing the second band section on the conveyor device relative to the first band section as a function of a relation between the front-edge shape and the rear-edge shape.

2. The method according to claim 1, wherein at least one of the front-edge shape and the rear-edge shape is calculated as the difference from a line running in the band direction.

3. The method according to claim 2, wherein at least one of the front-edge shape and the rear-edge shape is calculated at respective sampling points.

4. The method according to claim 3, wherein the sampling points at the front edge and at the rear edge are calculated respectively in identical positions in a direction crosswise to the direction of transport.

5. The method according to claim 1, wherein the relation is a minimal area difference between the front-edge shape and the rear-edge shape.

6. The method according to claim 1, further comprising calculating at least one of the front-edge shape and the rear-edge shape as the band section is guided to or over the conveyor device.

7. The method according to claim 1, further comprising simultaneously calculating the front-edge shape and the rear-edge shape of a band section and temporarily saving at least one of the calculated front-edge shape and rear-edge shape of the band section.

8. An apparatus for producing a scrim comprising:
   a conveyor device movable in a direction of transport;
   a band section feeder device;
   a placer structured and arranged to remove band sections from the band section feeder device, to guide the band sections over the conveyor device in a band direction oriented a predetermined angle to the direction of transport, and to deposit the band sections next to one another on the conveyor device in the direction of transport;
   a front-edge shape measuring device is structured and arranged to calculate a front-edge shape of a band section;
   a rear-edge shape measuring device is structured and arranged to calculate a rear-edge shape of a band section,
   a drive control connected to the front-edge shape measuring device and the rear-edge shape measuring device is structured to control a movement of at least one of the conveyor device and the placer as a function of a relation between the front-edge shape and the rear-edge shape.

9. The apparatus according to claim 8, wherein at least one of the front-edge shape measuring device and the rear-edge shape measuring device is arranged between the band section feeder device and the conveyor device.

10. The apparatus according to claim 8, wherein at least one of the front-edge shape measuring device and the rear-edge shape measuring device is embodied as a contactless measuring device.

11. The apparatus according to claim 8, further comprising a memory device, wherein at least one of the front-edge shape measuring device and the rear-edge shape measuring device is connected to the memory device.

12. The apparatus according to claim 8, wherein at least one the front-edge shape measuring device and the rear-edge shape measuring device is displaceable in the direction of transport.

* * * * *